United States Patent
Owens et al.

(10) Patent No.: US 11,218,445 B2
(45) Date of Patent: Jan. 4, 2022

(54) SYSTEM AND METHOD FOR IMPLEMENTING A WEB APPLICATION FIREWALL AS A CUSTOMIZED SERVICE

(71) Applicant: DELL PRODUCTS, LP, Round Rock, TX (US)

(72) Inventors: Mark D. Owens, Austin, TX (US);
Frank DiRosa, Pflugerville, TX (US);
Rene Herrero, Round Rock, TX (US);
Yongliang Li, Round Rock, TX (US);
Everton Schäfer, Lajeado (BR)

(73) Assignee: Dell Products L.P., Round Rock, TX (US)

( * ) Notice: Subject to any disclaimer, the term of this patent is extended or adjusted under 35 U.S.C. 154(b) by 239 days.

(21) Appl. No.: 16/524,722

(22) Filed: Jul. 29, 2019

(65) Prior Publication Data
US 2021/0036991 A1 Feb. 4, 2021

(51) Int. Cl.
*H04L 29/06* (2006.01)

(52) U.S. Cl.
CPC ...... *H04L 63/0236* (2013.01); *H04L 63/0263* (2013.01); *H04L 63/126* (2013.01); *H04L 63/0428* (2013.01); *H04L 63/20* (2013.01)

(58) Field of Classification Search
CPC ............ H04L 63/0236; H04L 63/0263; H04L 63/126; H04L 63/0428; H04L 63/20
See application file for complete search history.

(56) References Cited

U.S. PATENT DOCUMENTS

| 9,917,811 | B2 | 3/2018 | Folco et al. | |
| 10,298,613 | B2 | 5/2019 | Ast et al. | |
| 2010/0199345 | A1* | 8/2010 | Nadir | H04L 63/02 726/11 |
| 2010/0325588 | A1* | 12/2010 | Reddy | H04L 63/0263 715/853 |
| 2016/0359809 | A1* | 12/2016 | Phonsa | H04L 63/0263 |
| 2017/0249237 | A1 | 8/2017 | Watt et al. | |
| 2021/0028943 | A1* | 1/2021 | Moon | G06F 16/113 |

FOREIGN PATENT DOCUMENTS

EP 3 103 214 B1 3/2019

* cited by examiner

*Primary Examiner* — Vance M Little
(74) *Attorney, Agent, or Firm* — Larson Newman, LLP (57) ABSTRACT

A web application firewall (WAF) receives an application request from a router, wherein the application request is directed to a web application, and wherein the web application firewall is associated with the web application. The WAF updates the application request to include a first header, wherein the first header includes a copy of a uniform resource locator of the application request, and updates the uniform resource locator to indicate an address of the web application firewall. The WAF analyzes the application request to determine whether the application request is secure, wherein the analysis is based on a rule, and in response to a determination that the application request is secure, updates the application request to include a second header, wherein the second header includes an encrypted signature.

17 Claims, 4 Drawing Sheets

SYSTEM AND METHOD FOR IMPLEMENTING A WEB APPLICATION FIREWALL AS A CUSTOMIZED SERVICE

FIELD OF THE DISCLOSURE

The present disclosure generally relates to information handling systems, and more particularly relates to implementing a web application firewall as a customized service.

BACKGROUND

As the value and use of information continue to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A web application firewall (WAF) may receive an application request from a router, wherein the application request is directed to a web application, and wherein the web application firewall is associated with the web application. The WAF updates the application request to include a first header, wherein the first header includes a copy of a uniform resource locator of the application request, and updates the uniform resource locator to indicate an address of the web application firewall. The WAF analyzes the application request to determine whether the application request is secure, wherein the analysis is based on a rule, and in response to a determination that the application request is secure, updates the application request to include a second header, wherein the second header includes an encrypted signature.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
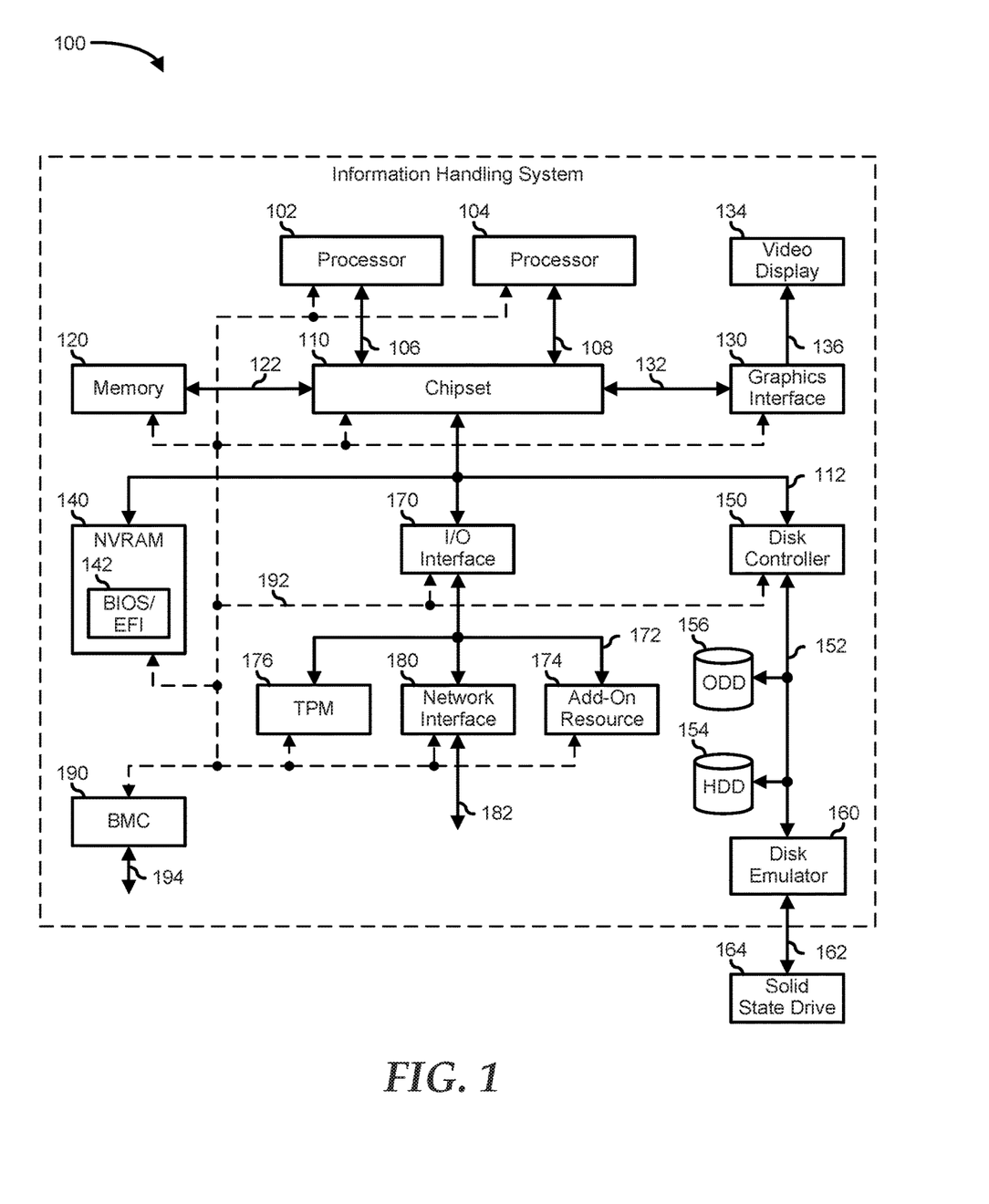
FIG. 1 is a block diagram of a general information handling system, according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like. Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132, and provides a video display output 136 to a video display 134. An example of a graphics interface 132 includes a Peripheral Component Interconnect-Express (PCIe) interface and graphics adapter 130 can include a four lane (x4) PCIe adapter, an eight lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an IEEE 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172 and network interface 180 translates information from a format suitable to the peripheral channel to a format suitable to external devices. In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code. BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WS-MAN) interface, a Management Component Transport Protocol (MCTP) or, a Redfish interface), various vendor defined interfaces (such as a Dell EMC Remote Access Controller Administrator (RACADM) utility, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100, or is integrated onto another element of the information handling system such as chipset 110, or another suitable element, as needed or desired. As such, BMC 190 can be part of an integrated circuit or a chipset within information handling system 100. An example of BMC 190 includes an integrated Dell remote access controller (iDRAC), or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

An increasing number of entities are deploying applications using cloud computing service providers. Computing services such as Cloud Foundry® deploy cloud applications in a micro-service architecture. The cloud computing services typically include a traditional firewall that generally works at the network and transport layers while a web application firewall (WAF) resists attacks in the application layer such as structured query language (SQL) injection, cross-site scripting (XSS), cross-site request forgery (CSRF), Lightweight Directory Access Protocol (LDAP) injection, PHP: Hypertext Preprocessor (PHP) injection, etc.

The WAFs generally filter through incoming traffic to identify and block potentially dangerous data. The WAFs allow transmission of incoming data that is deemed safe. Because the WAFs are generally deployed in front of a cloud service, they monitor the incoming traffic for all the web applications in the cloud service. Thus the WAFs are not customizable to monitor incoming traffic for a specific web application. This lack of flexibility can be an issue because web applications require different levels of security. For example wholesale blacklisting/blocking of certain types of data from being transmitted from a client device, such as blocking all executable files, blocking all Java files, blocking all flash files, blocking all media files, can be effective for certain specialized systems that are only used to perform certain types of tasks. For example, these specialized systems only require receipt of a specific subset of data types, such as a service whose only function is to forward text messages. However such wholesale blocking is problematic in most circumstances, as it may break functionality of certain software applications or web pages. For example, "application store" applications often download executable files and some web applications use a java applet.

Further, because the WAFs needs to run all the security rules for all the web applications each time the incoming traffic is received, the performance of the WAFs and the web applications are affected. The system and method in the current disclosure propose a solution to the above issues by implementing a WAF that can be bound for a specific web application or a specific set of web applications. By binding the WAF to one or more web applications, security rules applied by the WAF may be customized specifically to the needs of that specific web application(s).

Figure 2:
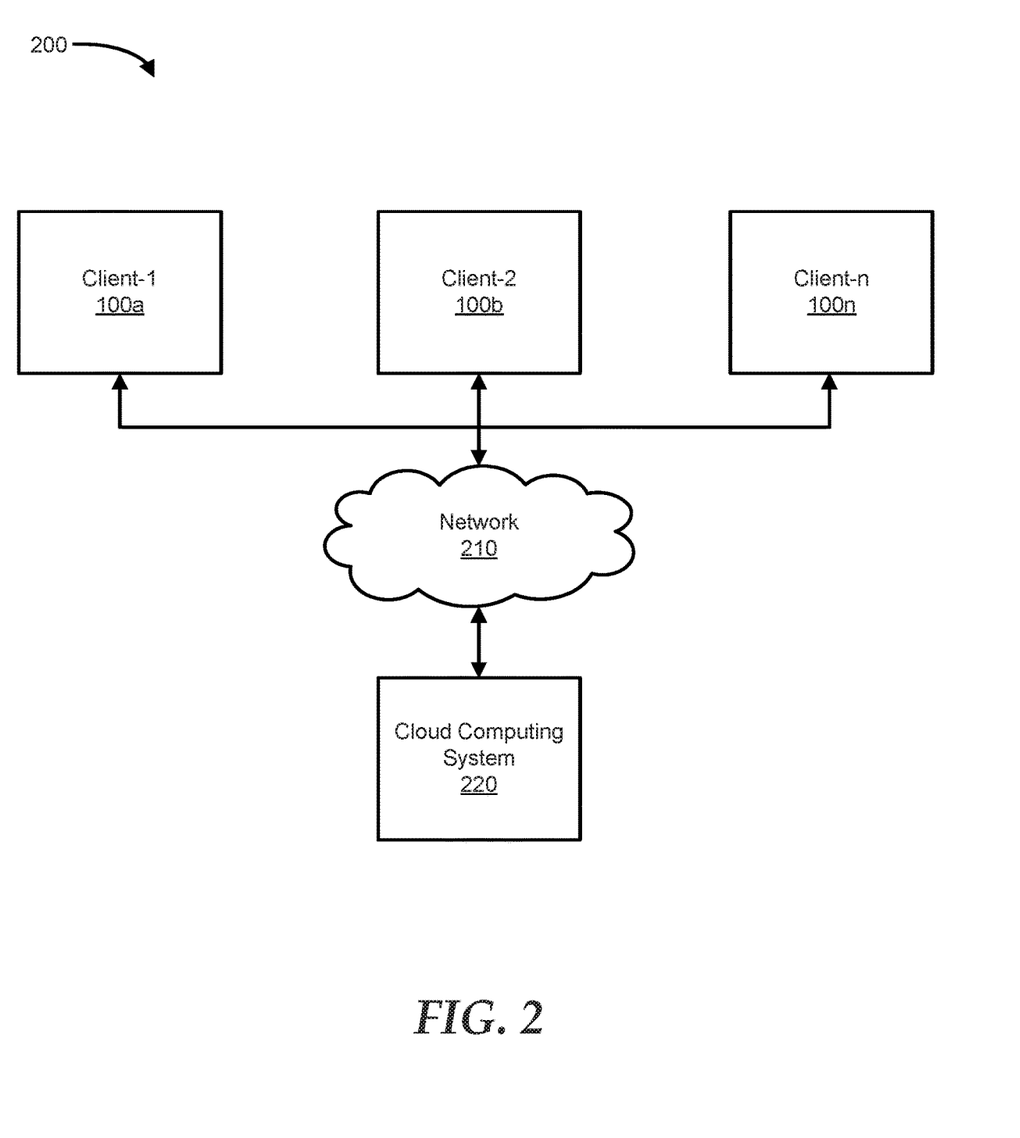
FIG. 2 is a block diagram of an exemplary computer system, according to at least one embodiment of the present disclosure.

FIG. 2 shows a computer system 200 for implementing a WAF as a customized service. Computer system 200 includes information handling systems such as clients 100a-100n coupled via a network 210 to a cloud computing system 220. The clients 100a-100n can include a desktop, a laptop or a tablet computer, a cellular telephone, or other types of processing devices capable of communicating with cloud computing system 220 over network 210. The processors included in clients 100a-100n may be any one of a variety of proprietary or commercially available single or multi-processor system, such as an Intel-based processor, or another type of commercially available processor able to support traffic in accordance with each particular embodiment and application. Clients 100a-100n are assumed to run respective client applications utilizing cloud computing system 220. For example, clients 100a-100n may be representative tenants of a cloud data center or another type of multi-tenant environment provided by cloud computing system 220. These tenants or other clients are also referred to herein as respective "users" of cloud computing system 220.

Network 210 may use any one or more of a variety of networks or another type of communication connection known to those skilled in the art. For example, network 210 may be a global computer network such as the Internet, a wide area network (WAN), a local area network (LAN), a satellite network, a telephone or cable network, a cellular network a wireless network implemented using a wireless protocol such as Wi-Fi® WiMAX®, or various portions or combinations of these and other types of communication networks. The type of communication connection used may vary with certain system parameters and requirements, such as those related to bandwidth and throughput required in accordance with a rate of data requests as may be issued by clients 100a-100n.

Cloud computing system 220 may be configured as a services environment to which an enterprise can entrust its data, applications, and services. Cloud computing system 220 generally includes hardware and software computing resources that are provided as a service. Cloud computing system 220 can include information handling systems, file-based storage, firewalls, load balancers, virtual local area networks, and computing platforms that typically include a programming language execution environment, a database, a web server, and cloud APIs. The cloud APIs may be used to build applications in cloud computing system 220. The cloud APIs typically allow data and computations to be requested from various clients. In a typical embodiment, the cloud APIs expose features via, for example, representational state transfer (REST) and/or simple object access protocol (SOAP).

Figure 3:
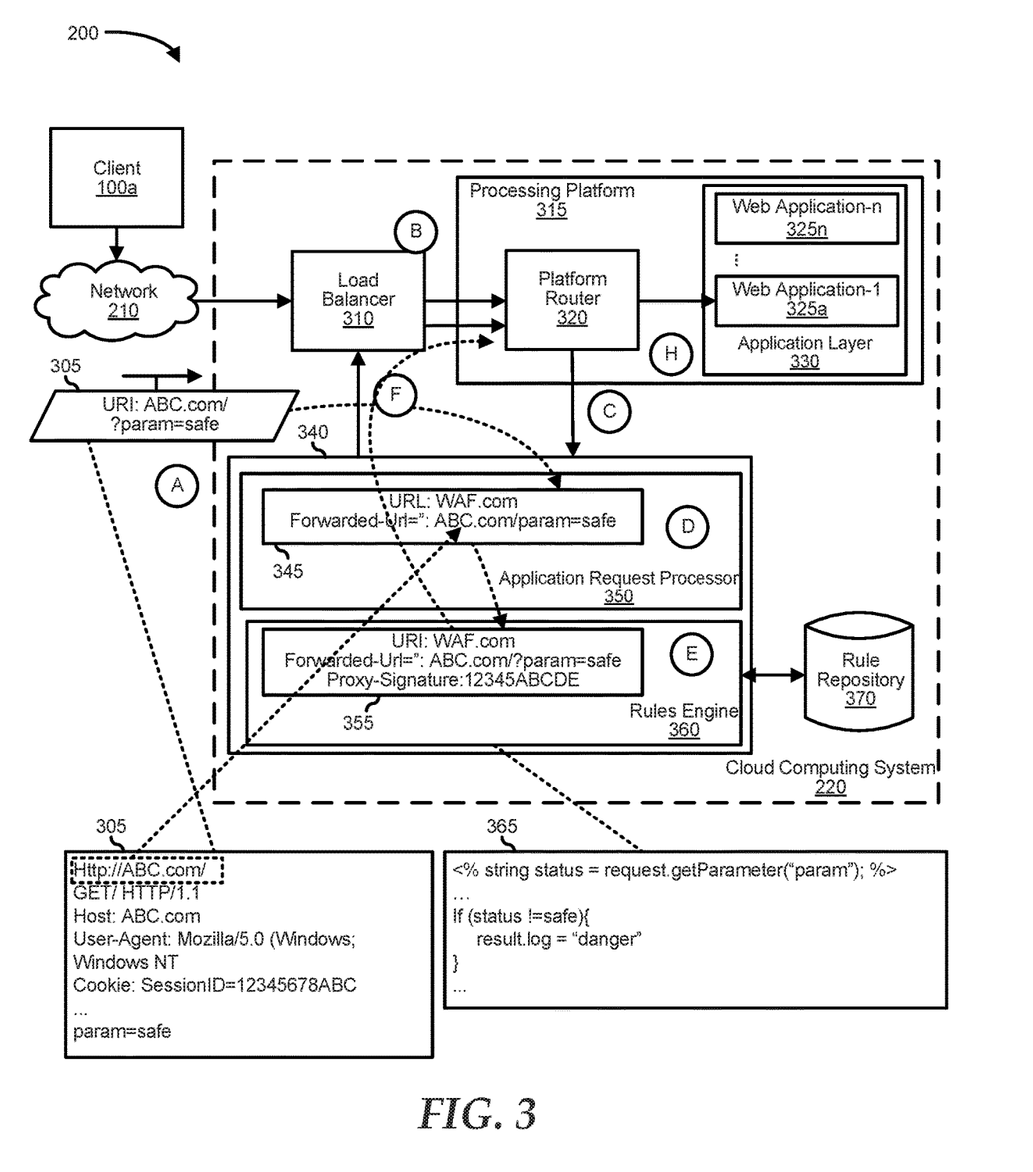
FIG. 3 is a more detailed illustration of the computer system, according to at least one embodiment of the present disclosure.

FIG. 3 shows computer system 200 including client 100*a*, network 210 and cloud computing system 220. Cloud computing system 220 includes a load balancer 310, a processing platform 315, a WAF 340, and a rule repository 370. Processing platform 315 comprises a multi-layered architecture that includes a platform router 320 and an application layer 330. Application layer 330 includes web applications 325*a*-325*n*. WAF 340 includes an application request processor 350 and a rules engine 360. WAF 340 includes an application request processor 350 and a rules engine 360.

Client 100*a* may be any entity that is capable of transmitting an application request such as an application request 305 to a web application in cloud computing system 220 via network 210. Generally, incoming network traffic to cloud computing system 220 such as application requests pass through a load balancer, such as load balancer 310. Load balancer 310 is configured to distribute client requests to the appropriate processing platform. For example, load balancer 310 may route a client request to a processing platform that is currently handling the fewest communications. Alternatively, load balancer 310 may employ a "round robin" process to assign each new client request to the next processing platform in an ordered list. If, however, the client request includes data that is affiliated with a particular processing platform or web application, then the load balancer may route the communication to that particular processing platform or web application.

Processing platform 315 includes a multi-layered architecture, such as Cloud Foundry, including at least platform router 320 and application layer 330. Platform router 320 routes incoming traffic to processing platform 315 to a web application in application layer 330. For example, platform router 320 routes an application request 305 to web application 325*a*. Application layer 330 is the topmost layer in processing platform 315 that hosts various applications such as email, management portals, productivity applications, etc.

Processing platform 315 may be assumed to include a plurality of devices each having a processor coupled to a memory and is configured to implement virtual resources for use by web applications. Various combinations of containers, virtual machines, and other virtual resources may be used in other embodiments. For example, virtual resources may comprise containers running in virtual machines. Additional or alternative virtual resources that may be used in a given embodiment include virtual machines. For example, the virtual resources may comprise a plurality of virtual machines allocable to respective ones of the web applications 325*a*-325*n*. Various combinations of containers, virtual machines, and other virtual resources may be used in other embodiments. For example, virtual resources may comprise containers running in virtual machines.

WAF 340 is a security policy enforcement service implemented in cloud computing system 220. WAF 340 intercepts incoming traffic from a client to a web application and filters the incoming traffic according to some set of rules or security policy. WAF 340 may include a hardware component, a software component, or some combination thereof. Although WAF 340 is shown as being implemented between load balancer 310 and platform router 320 in the present embodiment, in other embodiments, WAF 340 may be implemented between different components such as between platform router 320 and application layer 330. In addition, although in this embodiment WAF 340 is shown to include application request processor 350 and rules engine 360, in other embodiment, WAF 340 or at least a portion of one or more of its components may be implemented in a different configuration. For example, application request processor 350 and rules engine 360 may be combined as one component.

WAF 340 analyzes incoming Hypertext Transfer Protocol (HTTP) traffic or application requests and is configured to protect processing platform 315 against application layer attacks before it reaches the web applications. In the current disclosure, WAF 340 may monitor and validate the incoming requests based on a set of security policies. The term "security policy" as used herein is intended to be broadly construed, so as to encompass, for example, policies relating to one or more security-related factors such as confidentiality, integrity, and availability. Thus, one or more of the security policy may include requirements for one or more of these factors. For example, to filter out illegitimate traffic, a security policy may include one or more security rules. In addition, the security policy may specify the one or more security rules specific for a given web application. As used herein, security rules implement security policies. For example, the security rules define settings, conditions, and procedures for controlling and managing application requests. The security rules may have been pre-defined by an administrator or dynamically generated by analyzing the web application, learned from other application workloads running on or previously run on a processing platform utilizing a learning analytics module. As used herein, the term "administrator" will refer to a person or program authorized to configure security policy or rules for enforcement by the WAF.

Application request processor 350 processes the incoming application requests from various clients, such as application request 305. Application request processor 350 identifies the uniform resource locator (URL) in the application request, hereinafter the original URL. Application request processor 350 may generate a header that would contain a copy of the original URL. The original URL is then replaced with a URL of a reverse proxy, such as rules engine 360, that would be used to redirect the incoming request and would then determine and apply one or more security rules to the updated application request, such as application request 345. Rules engine 360 may retrieve the security rules from a data store such as rule repository 370.

Rule repository 370 may be some form of memory or data storage system that is either physically at WAF 340 or at a location that is accessible by WAF 340, such as a data storage server within cloud computing system 220. Rule repository 370 may, in some cases, store multiple security policies and/or security rules corresponding to multiple web applications. The security policies and/or security rules may be organized through the use of a data structure such as a database, a table, a hash table, an array, an array list, a tree, a list, a queue, or some combination thereof.

Security rule 365 is an example security rule that WAF 340 may apply to the application request 345. Security rule 365 may include a condition and an action based on an output of the condition. A portion of security rule 365 is shown in FIG. 3. As shown, the function of security rule 365 determines whether the value of parameter "param" is not equal to safe. If the value of param is not equal to safe then log "danger." Otherwise, application request 345 is marked safe or secure. Security rules may be written in a programming or a scripting language such as JavaScript Object Notation (JSON), Python, etc. Security rules may also be written as a table, text file, etc.

A report generator may be implemented to generate reports associated with the results of WAF 340. For example, a report may be generated that shows enforcement of at least one security policy involving each web application in application layer 330. Such a report may be used to provide visibility for administrators into the security enforcement provided by WAF 340.

Generally, the platform router receives all incoming traffic or application requests from the load balancer to the web applications in a processing platform. The platform router routes the incoming traffic to the appropriate web application for processing. However, before routing the incoming traffic to the web application, the platform router determines whether the incoming traffic has been rerouted from a WAF and whether the web application is bound to the WAF, such as WAF 340. If the incoming traffic has been rerouted from the WAF then the platform router forwards the processed incoming traffic to the web application. Otherwise, the incoming traffic may be dropped or denied. If the incoming traffic has not been rerouted from the WAF and the web application is bound to the WAF, then the platform router sends the incoming traffic to the WAF. The WAF may be bound to the web application or a set of web applications. One or more security policies and/or security rules may be associated with the WAF during the binding. The WAF analyses the incoming traffic using the associated security rules. After the WAF analyses the incoming traffic, the WAF sends the processed incoming traffic back to the load balancer. The loader balancer transmits the incoming traffic to the platform router.

In particular, WAF 340 may be a WAF implemented as a customized service such as a route service. Route service is a feature of cloud foundry. Cloud Foundry is an open source, multi-cloud application platform as a service. Route services perform filtering or content transformation on application requests and responses. However, route services do not provide security services for web applications. The current disclosure leverages the route service feature by binding the WAF to one or more web applications and using security rules specific to the needs of the web applications. WAF 340 would create a WAF/web server hybrid service as an application, such as WAF/Nginx service. The WAF/Nginx service acts as a web server and reverse proxy for the web application. WAF 340 is customized to run security rules against a particular web application, that is web application 325a. In this example, WAF 340 runs the security rules against the "Forwarded-URL" terminating incoming requests that did not pass the security rules and preventing such requests from reaching the web application.

For illustration purposes, client 100a is referred to in the following paragraphs. However, it is understood that the current disclosure is not limited to client 100a but instead is applicable to any one of clients 100a-100n in FIG. 1. It is understood that the functionality may be performed by an application or the like that resides in cloud computing system 220. FIG. 3 is annotated with a series of letters A-H. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations.

At stage A, a user may use one of clients 100a-100n such as client 100a to transmit application request 305 to web application 325a via network 210. Application request 305 may be an HTTP request that includes a uniform resource locator (URL), one or more parameters, or any other data for processing the application request. In this example, the URL is equal to "ABC.com" and a parameter "param" is equal to a value "safe." ABC.com is mapped to web application 325a. Application request 305 may also include a method, for example "GET", a version, a header, and a body. The parameter may be included in the header in the form of a name-value pair. At stage B, application request 305 is received by load balancer 310. Load balancer 310 is used to distribute network traffic among one or more processing platforms in cloud computing system 220. After receiving application request 305, load balancer 310 transmits application request 305 to processing platform 315. Application request 305 is first received by platform router 320.

At stage C, platform router 320 determines whether application request 305 has been rerouted and validated by WAF 340. If application request 305 has been rerouted and validated by WAF 340, then platform router 320 transmits application request 305 to web application 325a. Otherwise, platform router 320 determines whether web application 325a, the target web application in application request 305 is bound to WAF 340. If web application 325a is bound to WAF 340, then platform router 320 transmits application request 305 to WAF 340. Otherwise, then platform router 320 drops or terminates application request 305. In this example, web application 325a is bound to WAF 340.

Prior to stage C, WAF 340 was bound or provisioned to web application 325a. During the provisioning process, a set of security policies and/or security rules are determined and associated with web application 325a. The set of security policies and/or security rules may be manually associated by an administrator. For example, the administrator may use a command line interface (CLI) to bind WAF 340 to web application 325a. In addition, WAF 340 may dynamically determine and associate the set of security policies and/or security rules to web application 325a. At this point, security policies and/or security rules are customized for each web application or set of web applications.

During the provisioning, the topology and/or type of web application to be bound with the WAF may also be determined, such as whether the web application is a database application, a webmail, an online retail sales, etc. If the web application is a database application, then security rules against attack to a database application such as SQL injections attack may be identified and applied. In another example, security rules may be identified according to severity. In an embodiment, severity be "high," "medium," and "low." For example, security rules that are for database applications and have a severity for "high" may be identified and used during the provisioning. Finally, one or more security rules may be identified as default security rules and applied to all web applications in application layer 330.

At stage D, application request processor 350 receives and processes application request 305. The application request processor 350 may parse application request 305 and extract the URL, which is the originally requested URL. The request processor adds a first header and copies the extracted URL to the first header. In addition, application request processor 350 may update the URL in application request 305 with the URL for a reverse proxy. For example, application request processor 350 may use a header "Forwarded-URL" to contain the extracted URL. The application request 305 that includes the header "Forwarded-URL" may now be referred to as application request 345. Application request processor 350 may forward application request 345 to rules engine 360.

At stage E, rules engine 360 analyzes application request 345 by applying a set of security rules associated with web application 325a. The security rules may regulate the storage and access of data in web application 365. For example, rules engine 360 can restrict some particularly sensitive information from being transferred or manipulated. The security rules may restrict or allow access to data based on a set of users or roles. Based on the conditions in the applied security rules, rules engine 360 may then take appropriate action(s) on the incoming application requests that violate the security rules. For example, rules engine 360 may block or deny incoming application requests. Rules engine 360 may also blacklist a particular client internet protocol (IP) address or limit the number of connections accepted from the particular client. During the analysis, rules engine 360 may retrieve the set of security rules from a data store such as rule repository 370. Rule repository 370 may store a set of rules associated with different web applications from one or more processing platforms.

At stage F, after applying the set of security rules against application request 345, rules engine 360 may validate application request 345 and may forward the validated application request. For example, rules engine 360 applies security rule 365 to application request 345. If the application request 345 passed validation, then rules engine 360 may add a second header that includes a signature certifying that application request 345 passed validation. Application request 355 represents application request 345 after passing validation. Instead of the signature, the second header may include value and/or flag to identify that the request has been validated. The rules engine 360 may also include information and/or metadata for platform router 320 to determine whether the forwarded application request has been analyzed and/or validated, such as a time stamp, IP address of WAF 340, etc. Application request 355 shows application request 345 after it has been validated and a signature added. If application request 345 does not pass validation, then rules engine may drop or terminate application request 345.

At stage H, platform router 320 receives application request 355 from WAF 340. Platform router 320 determines whether application request 355 has been rerouted from and validated by WAF 340. For example, platform router 320 parses application request 355 and determines whether it includes the header "Proxy-Signature." Platform router 320 also determines whether the timestamp is within the allotted time period, that is the application request is not expired. Generally, the application request may be allotted a certain time period for analysis. Even if the application request is validated but the timestamp is passed the allotted time period, then platform router 320 may drop or terminate the application request.

Figure 4:
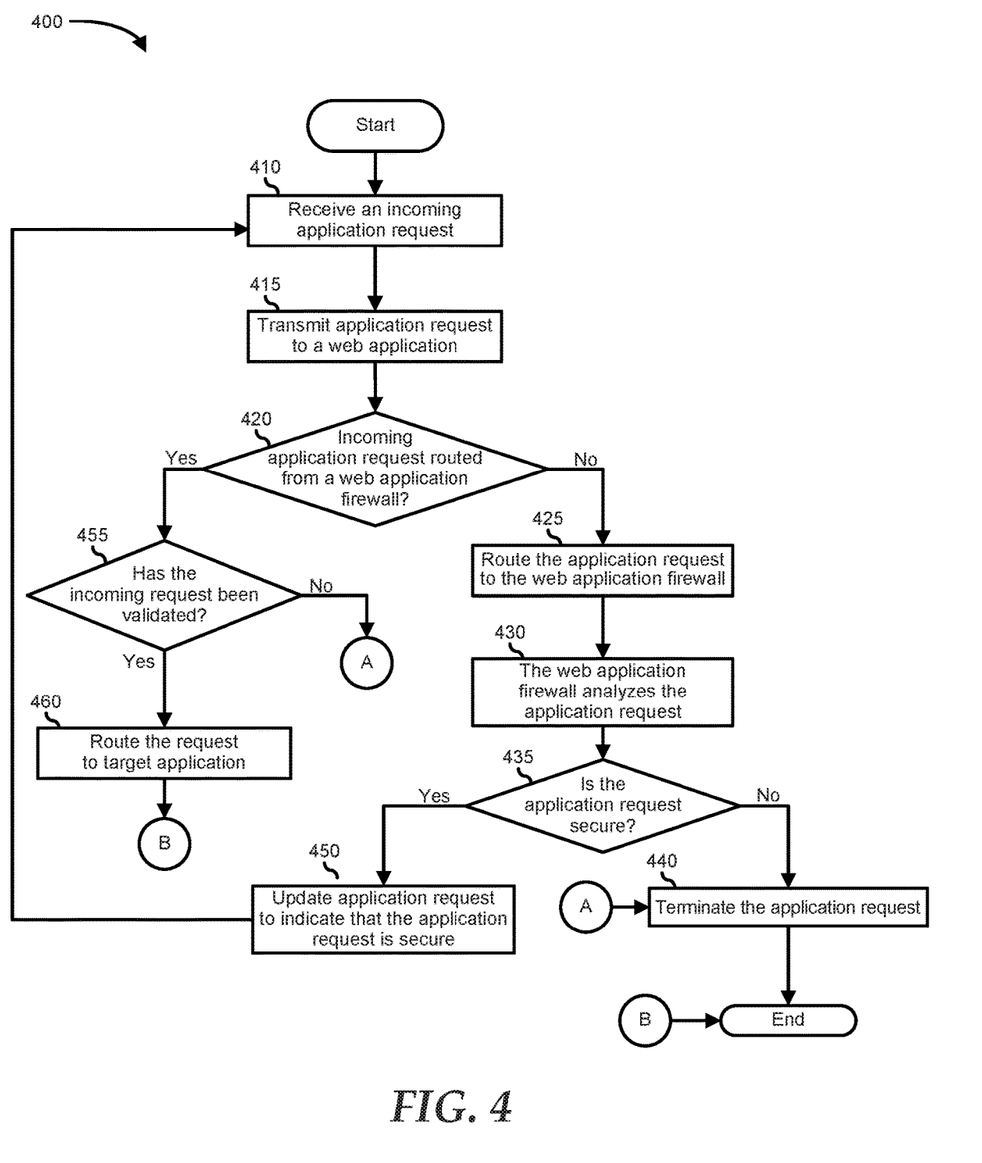
FIG. 4 is a flowchart illustrating a method for implementing a web application firewall as a customized service, according to at least one embodiment of the present disclosure.

FIG. 4 shows a method 400 for implementing WAF as a customized service. Prior to the start of method 400, the WAF is provisioned or bound to a web application. During the binding of the WAF to the web application, a set of security policies or security rules may be associated with the web application. Associating the security rules to the web application means that the WAF uses the associated security rules or a portion thereof to monitor and/or validate application requests transmitted to the web application. Binding WAF to a web application also associates binding WAF 340 with a route in platform router 320. The route may be an address to reach a web application that is mapped to the route. Application requests for the route may be proxied to a URL specified in the route.

Method 400 typically begins at block 410. At block 410, method 400 receives an incoming application request directed to the target web application. The application request is normally received at the load balancer for the cloud service. Block 410 may be performed by a load balancer in the cloud computing system. The method then proceeds to block 415.

At block 415, the load balancer transmits the application request to the web application in the application request. In particular, the application request may be transmitted to the router of the processing platform that is hosting the web application identified in the request. Block 415 may be performed by the load balancer in the cloud computing system. The method then proceeds to block 420.

At block 420, the router determines whether the incoming application request has been previously routed from the WAF. The application request may include information that identifies whether it has been routed from the WAF. In addition, the router may determine whether the application request was routed from the WAF that the router transmitted the application request to initially. For example, the application request may include a header with a WAF identifier. The router may parse the application request to identify the WAF using the WAF identifier. If the router determines that the incoming application request has been routed from the WAF, then the method proceeds to block 455, otherwise, the method proceeds to block 425.

At block 425, the router routes the application request to the WAF. The method then proceeds to block 430. At block 430, the WAF processes and analyzes the application request. The WAF parses the application request and determines the URL of the web application. The WAF adds a header, such as Forwarded-URL header shown in FIG. 3 that includes the original URL. The WAF may update the URL in the application request with a URL of a reverse proxy. As shown in application request 345 in FIG. 3, the header Forwarded-URL has been updated to include the URL "ABC.com/param=safe". In addition, the URL has been updated to "WAF.com" from "ABC.com." The WAF may then forward the application request to the reverse proxy. The reverse proxy may be an internal or an external component to the WAF. In this example, the WAF performs the function of the reverse proxy. The method proceeds to block 430.

At block 430, the WAF analyzes the application request to determine whether to allow or block the application request. The WAF performs the analysis by applying one or more of the security rules associated with the web application, also referred to as target web application. A security rule may specify to allow application requests from a trusted user or client. Users and/or clients may be trusted based on various attributes such as whether the client is corporate-owned or a personal device, whether the user and/or client is in a public or private network. The security policy can identify, among other information, authorized sources of data for the target web application. This can be represented as a whitelist. On the other hand, the security policy can also identify unauthorized sources of data, that can be represented as a blacklist. The WAF may then identify whether the client is authorized by appearing on the whitelist. The WAF may then identify whether the client is unauthorized by not appearing on the whitelist or by appearing on the blacklist, or both.

In another embodiment, the WAF may detect unauthorized content in the application request such as malware. For example, upon receipt of the application request, the WAF can parse the markup code, for example, the Hypertext Markup Language (HTML) as well as any JavaScript or PHP code, to identify a trigger mechanism of the malware. The WAF may search for URLs, IP addresses, parameters, or other identifying strings within the markup code of the application request. WAF may identify the malware by detecting its triggering mechanism and strips out at least enough of the malware to stop the client from trying to later retrieve data from the web application. Once the malware is detected, WAF may either return nothing to the browser of the client or return an error message, such as a 403 "access denied/forbidden" error.

The security policy may include "authorized clients" field, which may identify an IP address, a MAC address, a client name, a domain name, etc. that are authorized or whitelisted to access the web application. Any other client attempting to access the web application may be rejected or blocked. In addition, the security policy may also include an "unauthorized clients" field, which may identify an IP address, a MAC address, a client name, a domain name, etc. that are unauthorized or blacklisted to access the web application. A client that is not blacklisted attempting to access the web application may be authorized. In another example, the security policy may only allow clients that are whitelisted and not blacklisted to access the web application.

The security policy may include an "authorized resource types" field which identifies types of data that are authorized to be used with a domain identified in the domain field. In another embodiment, the "authorized resource type" field may be used with a client identified in the client field. For example, the security policy may state that application requests associated with the client with a particular MAC address may provide markup data (for example, ".html" files, ".css" files, ".xml" files), PHP data (for example, ".php" files), and JavaScript data (for example, ".js" files). Any other file types not identified in the "authorized resource types" field may be rejected and/or blocked by the WAF from reaching the web application.

The security policy may include a "reverse DNS required" field, which identifies whether or not the domain identified in the domain field requires a reverse DNS mapping that provides some identifying information about the client device to the web application. Reverse DNS is sometimes used by analytics platforms or email clients, for example. In some cases, the WAF may be adjusted to also block pages that require a reverse DNS mapping. Some security policies may have a mix of whitelists and blacklists. For example, a hypothetical security policy may include an "authorized clients" field and a "blacklisted resource types" field. Alternately, another hypothetical security policy may include a "blacklisted hosts" field and an "authorized resource types" field.

The WAF may provide an administrator with a user interface such as a command line interface for configuring and revising the security policies and/or security rules. Each security rule may include a rule number, which may be used to identify the security rule, for example, to edit it. Each security rule may also include a condition and an action. The security rule may also include a description, a web application identification, communication method indicator, etc. The description can be used by the administrator to provide a convenient description of the security policy and/or security rule.

At block 435, the WAF determines whether the application request is secure, that is whether the application request passed validation. If the application request is secure then the method proceeds to block 450. Otherwise, the method proceeds to block 440. At block 440, the application request is terminated. After terminating the application request the method ends.

At block 450, the WAF updates the application request to indicate that the application request has been validated or secure. For example, the WAF may add a second header that includes a value signaling that the application request has been validated or secure by the WAF. For example, the second header may include the original URL, a signature, a flag, a timestamp, or a combination thereof. The timestamp indicates when the application request was validated. The signature and/or the flag may indicate whether the application is secure. For example, if the application is secure, then the WAF may include a signature in the application request. In another example, the flag may be set to true or 1 if the application request is secure. Otherwise, the flag may be set to false or 0. In addition, the second header and/or the signature may be encrypted such that it can only be decrypted by the router. The method then proceeds to block 410.

At block 440, the WAF terminates the application request. At block 455, the router may decrypt the second header if encrypted and determine information included in the second header. For example, the router determine if the application request includes a signature. In addition, the router may compare the URL in the second header and compare it with the URL in the application request. If the URLs do not match then the router may drop the application request. In addition, the router may also determine whether the timestamp has expired and/or whether the application request was rerouted from the WAF.

Other variations of method 400, are possible and are intended to fall within the scope of the disclosure. Each block of method 400 or portions thereof may be performed by one or more suitable components of the systems described above in relation to FIG. 2 and FIG. 3. Further, each block may be performed in a different sequence such as in parallel with another block.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein. Also, the term "user" in this context and elsewhere herein is intended to be more broadly construed so as to encompass, for example, human, hardware, software or firmware entities, as well as various combinations of such entities.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method for efficiently protecting web applications, the method comprising:
   receiving by a router, an application request, wherein the application request is directed to one of the web applications;
   provisioning a web application firewall, including binding the web application firewall to the web application;
   parsing the application request, wherein the parsing the application request includes identifying a first uniform resource locator;
   adding a first header to the application request;
   copying the first uniform resource locator to the first header;
   updating the first uniform resource locator with a second uniform resource locator, wherein the second uniform resource locator includes an internet protocol address of the web application firewall;
   routing the application request to the web application firewall, wherein the web application firewall is between the router and the web application;
   determining a rule to apply to the application request, wherein the rule is associated with a security policy;
   analyzing the application request to determine whether the application request is secure, wherein the analyzing is based on the rule, and wherein the analyzing the application request includes applying the rule to the application request;
   in response to a determination that the application request is secure, transmitting the application request to the router by the web application firewall;
   determining, by the router, whether the application request has been transmitted from the web application firewall; and
   in response to the determining that the application request has been transmitted from the web application firewall, verifying that the application request is secure and routing the application request to the web application.

2. The method of claim 1, further comprising in response to a determination that the application request is not secure, denying the application request.

3. The method of claim 1, wherein the binding the web application firewall to the web application includes associating the security policy to the web application firewall and the web application.

4. The method of claim 1, wherein the first uniform resource locator includes an internet protocol address of the web application.

5. The method of claim 1, further comprising in response to the determining that the application request is secure, adding a second header to the application request, wherein the second header includes a signature to identify that the application request is secure, and wherein the signature is encrypted.

6. The method of claim 5, wherein the signature is encrypted such that only the router can decrypt the signature.

7. The method of claim 6, wherein the verifying that the application request is secure further includes decrypting the signature in the application request.

8. The method of claim 5, wherein the verifying that the application request is secure further includes verifying whether the application request is within a timeout period.

9. A web application firewall comprising:
   a memory coupled to a processor;
   the processor configured to:
      receive an application request from a router, wherein the application request is directed to a web application, and wherein the web application firewall is associated with the web application;
      update the application request to include a first header, wherein the first header includes a copy of a uniform resource locator of the application request;
      update the uniform resource locator to indicate an address of the web application firewall;
      analyze the application request to determine whether the application request is secure, wherein the analysis is based on a rule;
      in response to a determination that the application request is secure, update the application request to include a second header, wherein the second header includes an encrypted signature; and
      transmit the application request to the router.

10. The web application firewall of claim 9, wherein the rule is associated with the web application.

11. The web application firewall of claim 9, wherein the web application firewall is between the router and the web application.

12. The web application firewall of claim 9, wherein the second header is encrypted such that only the router can decrypt the second header.

13. A system for efficiently providing customized protection to a web application, comprising:
   a cloud platform to host the web application;
   a router to route an application request received to the web application;
   a memory coupled to a processor; and
   the processor configured to:

provision a web application firewall that includes the processor operable to bind the web application firewall to the web application;

parse the application request to identify a first uniform resource locator;

add a first header to the application request;

copy the first uniform resource locator to the first header;

update the first uniform resource locator with a second uniform resource locator, wherein the second uniform resource locator includes an internet protocol address of the web application firewall;

route the application request to the web application firewall, wherein the web application firewall is between the router and the web application;

determine a rule to apply to the application request, wherein the rule is associated with a security policy;

analyze the application request to determine whether the application request is secure based on the rule;

in response to a determination that the application request is secure, transmit the application request to the router;

determine, by the router, that the application request has been transmitted from the web application firewall; and in response to a determination that the application request has been transmitted from the web application firewall, verify that the application request is secure and route the application request to the web application.

14. The system of claim 13, wherein the processor is further configured to bind the web application firewall to the web application by associating the security policy to the web application firewall.

15. The system of claim 13, wherein the processor is further configured to deny the application request in response to a determination that the application request is not secure.

16. The system of claim 13, wherein the processor is further configured to add a second header to the application request, wherein the second header includes a signature to identify that the application request is secure.

17. The system of claim 16, wherein the second header is encrypted such that only the router can decrypt the second header.

\* \* \* \* \*